United States Patent [19]

Rangan

[11] Patent Number: 5,583,994
[45] Date of Patent: Dec. 10, 1996

[54] SYSTEM FOR EFFICIENT DELIVERY OF MULTIMEDIA INFORMATION USING HIERARCHICAL NETWORK OF SERVERS SELECTIVELY CACHING PROGRAM FOR A SELECTED TIME PERIOD

[75] Inventor: P. Venkat Rangan, San Diego, Calif.

[73] Assignee: Regents of the University of California, Oakland, Calif.

[21] Appl. No.: 192,654

[22] Filed: Feb. 7, 1994

[51] Int. Cl.$^6$ .................... G06F 13/00; H04N 7/173; H04H 1/02
[52] U.S. Cl. .................... 395/200.09; 348/7
[58] Field of Search .................... 395/200.09; 348/7

[56] References Cited

U.S. PATENT DOCUMENTS

| | | | |
|---|---|---|---|
| 5,130,792 | 7/1992 | Tindell et al. | 348/9 |
| 5,172,413 | 12/1992 | Bradley et al. | 380/20 |
| 5,341,474 | 8/1994 | Gelman et al. | 395/200.09 |

OTHER PUBLICATIONS

A store–and–Forward Architecture for Video–on–Demand Service A. D. Gelman & others, pp. 0842–0846, GlobeCom '91.
Optimization Model For The Delivery Of Interactive Multi Media Documents, S. L. Hardt–Kornacki & others, pp. 0699–0673 GlobeCom '91.
"A Digital On–Demand Video Service Supporting Content-–Based Queries", by T. D. C. Little & others, ACM Multimedia, pp. 427–436, Jun. 1993.
"Streaming RAID© A Disk Array Management System For Video Files", by Fouad A. Tobagi & others, ACM Multimedia, pp. 393–400, Jun. 1993.
"Disigning an On–Demand Multimedia Service", By P. Venkat Rangan & Others, IEEE Communcations Magazine, pp. 56–64, Jul. 1992.
Gelman et al. "On Buffer Requirement for Store and Forward Video On Demand Service Circuits", Globecom '91: IEEE Global Tele. Conf., pp. 0976–0980.
Gelman et al. "An Architecture for Interactive Applicationa", Communications, 1993 IEEE Inter. Conference, V.2, pp. 848–852.
Gelman et al. "Analysis of Resource Sharing in Information Providing Services"Globecom '90: IEEE Global Telecommunications Conference, pp. 0312–0316.

*Primary Examiner*—Thomas Q. Lee
*Assistant Examiner*—D. Dinh
*Attorney, Agent, or Firm*—Fuess & Davidenas

[57] ABSTRACT

A multimedia information delivery network system is disclosed for delivering multimedia programs to a plurality of users at user-selected times. The network includes a wide area transmitter for transmitting the multimedia programs. Additionally, the network includes a plurality of network servers for receiving the programs and for selectively caching the programs for retransmission to downstream network servers and/or directly to one or more users at the user-selected transmission times. A scheduler receives the user-selected transmission times and, in response thereto, establishes a network server path by which the multimedia program is efficiently delivered to each user at the respective user-selected time.

19 Claims, 4 Drawing Sheets

5,583,994

SYSTEM FOR EFFICIENT DELIVERY OF MULTIMEDIA INFORMATION USING HIERARCHICAL NETWORK OF SERVERS SELECTIVELY CACHING PROGRAM FOR A SELECTED TIME PERIOD

FIELD OF THE INVENTION

The present invention relates generally to multimedia system architectures, and more particularly to methods and systems for efficient, on-demand delivery of multimedia information and programs.

BACKGROUND

Historically, both educational information and entertainment programs have been generated by content providers and delivered to users in a variety of formats, including printed publications, data storage media, and electronic broadcast signals. To access printed publications and data storage media, users are required to borrow or purchase the publications or media. This typically requires the users who desire access to travel to the information storage facilities to obtain the desired media, and in any case to store the media at the users' facilities for access at a time convenient for the users.

On the other hand, gaining access to information carried by broadcast signals is comparatively simpler, requiring only that the user tune a receiver in to the broadcast at the scheduled broadcast time. Unfortunately, the information sought by the user is available only at the time of broadcast, which may not necessarily be the time most convenient to the user.

Nevertheless, recognizing the advantages inherent in electronically broadcasting information, many content providers now electronically publish educational information for broadcast which was previously made available only in printed publications. A trend is therefore clearly emerging, colloquially termed the "information superhighway", in which large amounts of educational and entertainment programs and information ("multimedia") will be electronically available to a large number of users. Stated differently, multimedia encompasses both traditional audio-video television-type programs and programs spawned by the convergence of diverse industries and technologies including communications, computer, entertainment, publishing, film, and television, and multimedia programming is expected to be widely available.

Under certain circumstances, a user may be able to record a broadcast program for review at a later, more convenient time than the broadcast time. It will be appreciated, however, that requiring each user to store a particular program on a storage medium, e.g., a VCR, dedicated only to that user is inefficient. More particularly, each user must obtain his or her own storage medium and record the program separately from the storage media of other users, thereby duplicating resources and effort and consequently greatly increasing the overall cost to the users who wish to access the program.

Not surprisingly, attempts have been made to address the problem noted above by providing multimedia architectures which permit so-called "video-on-demand". Most of these architectures share the common attribute of requiring immense central data storage servers capable of storing vast amounts of data. These architectures necessarily entail unprecedented demands on the networks over which the data from the storage servers can be transmitted to users.

Unfortunately, a single motion picture requires several gigabytes of storage space. Accordingly, it will be appreciated that storing a full library of motion pictures, a full library of digitized literature and imagery, encyclopedic data, and so on, and, in turn, broadcasting such information on demand to various users at various times around the clock, would stretch and exceed the capacity of current storage and network technology.

In light of the above, it is an object of the present invention to provide a multimedia architecture for efficiently delivering video at user-defined times. Another object of the present invention is to provide a hierarchical multimedia delivery architecture which is easy to use and cost-effective.

SUMMARY OF THE INVENTION

A system for delivering a multimedia program to a plurality of users includes at least one wide area server for transmitting the multimedia program. Also, the system includes a plurality of network servers for receiving the multimedia program from the wide area server and for selectively caching the multimedia program for respective storage time periods. The network servers transmit the multimedia program at the expirations of their respective storage time periods to the users. In one special case, at least some of the network servers are all arranged in tandem.

Typically, the transmission of a program from a server has an associated predetermined transmission factor. Further, each storage time period has an associated predetermined caching factor which increases over time, and each storage time period also defines an associated preselected end time. The transmission factors and caching factors associated with delivering the program from the metropolitan area server to each of the users at the respective preselected times establishes an aggregate delivery factor. A scheduler is provided for receiving the preselected times from the users and for establishing the storage time periods in response thereto to minimize the aggregate delivery factor.

In accordance with the present invention, the scheduler also determines which network servers cache the program for each user. Additionally, the scheduler causes a network server to cache the multimedia program only at one of the preselected times. Moreover, the scheduler prevents a downstream network server from transmitting the program back to the wide area server.

In another aspect of the present invention, a multimedia delivery network for delivering a multimedia program to a plurality of users has a network architecture that is characterized by at least one wide area multimedia program transmitter. Also, the network includes at least one network switch in tandem with the wide area multimedia program transmitter for relaying the multimedia program to a user. Furthermore, the network includes a network storage device which is associated with the network switch for caching the multimedia program for a storage time period and for causing the switch to retransmit the multimedia program to a user at a preselected time.

In still another aspect of the present invention, a method is disclosed for delivering a multimedia program to a plurality of users at user-selected times. The method of the present invention includes the steps of transmitting the program from a wide area transmitter, and receiving the program at a plurality of network servers. Then, each network server is caused to retransmit the program to the end users at one or more of the respective preselected times. Preferably, the method further includes causing one or more network servers to cache the program for an associated storage time period. For optimal performance, a downstream network server would tap the program as it flows from an upstream network server to the end user.

The details of the present invention, both as to its structure and operation, can best be understood in reference to the accompanying drawings, in which like reference numeral refer to like parts, and in which:

DESCRIPTION OF THE PREFERRED EMBODIMENT

Figure 1:
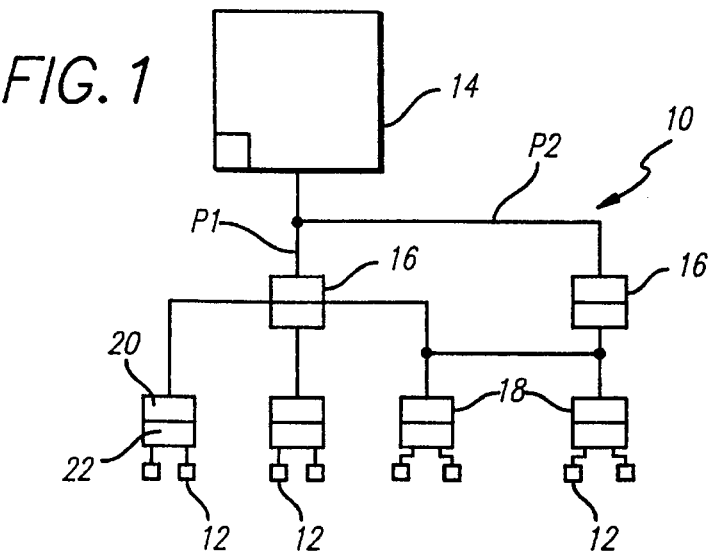
FIG. 1 is a schematic diagram showing a hierarchical multimedia network architecture.

Referring initially to FIG. 1, a hierarchical multimedia network is shown, generally designated 10. In accordance with the present invention, the network 10 transmits video-based programs, including multimedia educational and entertainment programs that may contain alpha-numeric displays in addition to video displays and audio signals, to a plurality of users 12. Stated differently, the present invention encompasses the delivery of both traditional audio-video television-type programs, as well as multimedia programs spawned by the convergence of diverse industries and technologies including communications, computer, entertainment, publishing, film, and television.

As the skilled artisan will appreciate, the users 12 include personal or local receiving apparatus, e.g., personal television sets or computers. Also, as more fully disclosed below, each user 12 may include automated means for selecting particular multimedia programs transmitted by the network 10, and for selecting the times at which the user 12 wishes to view the particular programs.

As shown in FIG. 1, the network 10 includes at least one wide area server 14. The wide area server 14 may be any appropriate wide area multimedia transmitter, e.g., the equipment associated with transmitting the signals of a network news company.

Also, the network 10 includes at least one and preferably a plurality of primary network servers 16. As shown in FIG. 1, each primary network server 16 is in tandem with the wide area server 14. In other words, each primary network server 16 receives the signals transmitted by the wide area server 14. In one presently preferred embodiment, each primary network server 16 is a metropolitan area server, e.g., the equipment associated with transmitting the signals of a metropolitan cable television company.

Further, a plurality of secondary network servers 18 are each arranged in tandem with an associated primary network server 16 for receiving signals therefrom, and as shown in FIG. 1 one primary network server 16 can feed signals to one or more secondary network servers 18. In turn, a secondary network server 18 can feed signals to other secondary network servers (not shown). Thus, the primary servers 16 are upstream from their associated secondary servers 18, and downstream from the wide area server 14. In other words, a downstream network server can tap the program as it flows from an upstream network server to the end user. Each secondary network server 18 can be a multimedia hub, e.g., a neighborhood electronic signal transmission and storage facility.

While FIG. 1 shows two levels of network servers 16, 18, it is to be understood that the network 10 can include additional levels of network servers (not shown).

Each network server 16, 18 (and any additional levels of network servers) includes an associated switch 20 and an associated storage device 22. Each switch 20 can advantageously be a network toll switch as is well-known in the art. Thus, each network toll switch 20 essentially functions as a relay by retransmitting, at a preselected time to the server 16, 18 (or user 12) that is immediately downstream of the particular switch 20, the signal received from the server 14, 16, or 18 that is immediately upstream of the server associated with the particular switch 20. The preselected time for retransmission may of course be instantaneously upon receipt of the signal from the upstream server 16, 18.

Moreover, each storage device 22 can be a well-known electronic media storage device, e.g., a magnetic or optical disc with associated support equipment. Accordingly, each storage device 22 can electronically copy, i.e., store, predetermined programs which are received at the associated server 16, 18 for subsequent retransmission of the programs by the associated switch 20.

Figure 2:
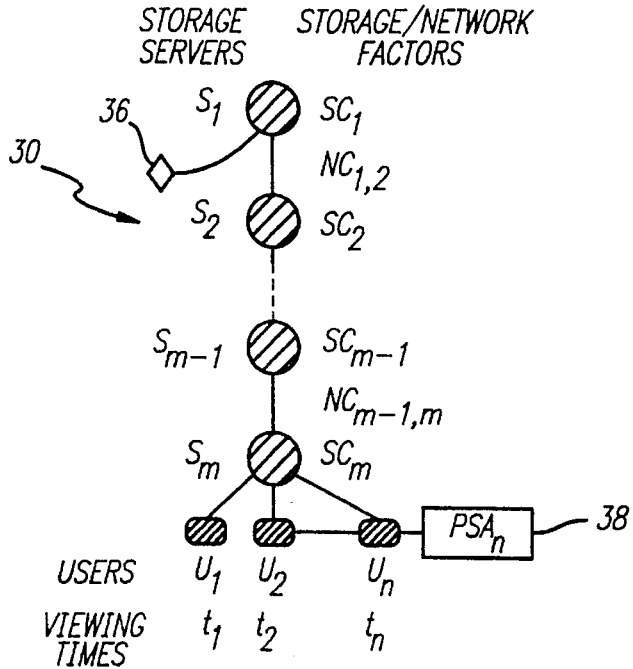
FIG. 2 is a schematic diagram showing a simplified multimedia network architecture using only a single path of tandem servers.

FIG. 2 shows a simplified multimedia network, generally designated 30, having a wide area server $S_1$ and a series of network servers $S_2$–$S_m$ arranged in tandem for delivering multimedia programs to a plurality of users $U_1$–$U_n$ at respective preselected delivery times $t_1$–$t_n$. Each transmission from a server $S_{k-1}$ to a server $S_k$, $k \in (1,m)$ entails an associated transmission factor $NC_{k-1,k}$ which is ordinarily a constant value.

Also, an associated storage factor $SC_k$ is associated with the storage of a program at a server $S_k$, and each storage factor $SC_k$ increases linearly in proportion to the time period during which the associated program is stored at the server $S_k$. Stated differently, each storage factor $SC_k$ is essentially the product of a fixed storage coefficient $SC_{kcoef}$ and a storage time period. Together, the aggregate transmission factors $\Sigma_{k=1}{}^n NC_{k-1,k}$ and storage factors $\Sigma_{k=1}{}^n SC_k$ establish an overall aggregate delivery factor.

As intended by the present invention, the overall efficiency of the network 30, as measured by the aggregate delivery factor, is minimized by judiciously selecting which servers S store and retransmit the program to which users U as per the following disclosure. It is to be understood that the factors discussed above may in practice be expressed in units such as time, bandwidth, memory capacity, transmission power, and even monetary cost.

Figure 3:
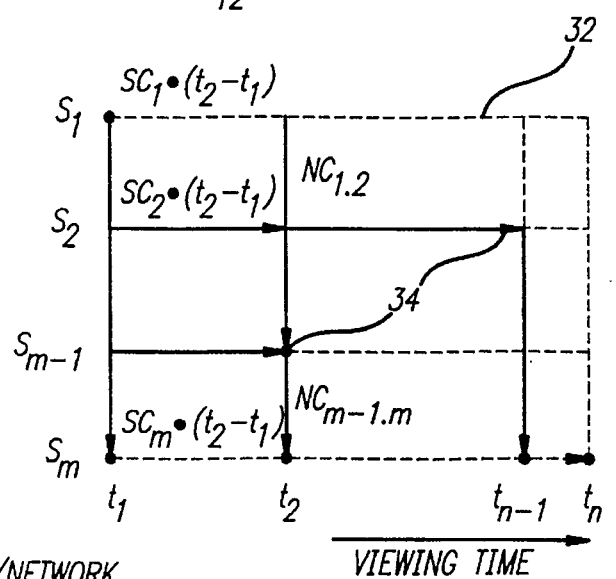
FIG. 3 is a graphical representation of the network shown in FIG. 2.

FIG. 3 is a graphical representation of the network 30 shown in FIG. 2, wherein the network 30 has been mapped to a two dimensional grid 32 which shows the various ways in which a program can be delivered to the users $U_1$–$U_n$. As shown, the ordinate of the grid 32 represents the servers $S_1$–$S_m$, and the abscissa represents the preselected viewing times $t_1$–$t_n$ in increasing temporal sequence.

Accordingly, the skilled artisan will appreciate that the vertical lines within the grid 32 represent and are proportional to the transmission factors NC and the horizontal lines represent and are proportional to the storage factors SC. Thus, by minimizing the total length of the lines extending between the 0, $S_1$ vertex and the $t_n$, $S_m$ vertex, the aggregate delivery factor can be minimized.

In the network 30 architecture represented in FIGS. 2 and 3, the aggregate delivery factor can be minimized by selecting a path with the following constraints: The path must be rooted at the 0, $S_1$ vertex and extend to the $t_n$, $S_m$ vertex; the path of the program to the $n^{th}$ user (denoted by the arrows 34 in FIG. 3) must extend downwardly and rightwardly from the 0, $S_1$ vertex, and cannot extend leftwardly (or back to the wide area server) during any portion of the delivery; and the program is transmitted from one server $S_{a-1}$ to its downstream server $S_a$ (or to a user U) only at one of the preselected viewing times $t_1$–$t_n$. Stated differently, the program is transmitted from an upstream server $S_{a-1}$ to its downstream server $S_a$ only when the program is to be transmitted from the upstream server $S_{a-1}$ to a user U, and at no other times.

Figure 4A:
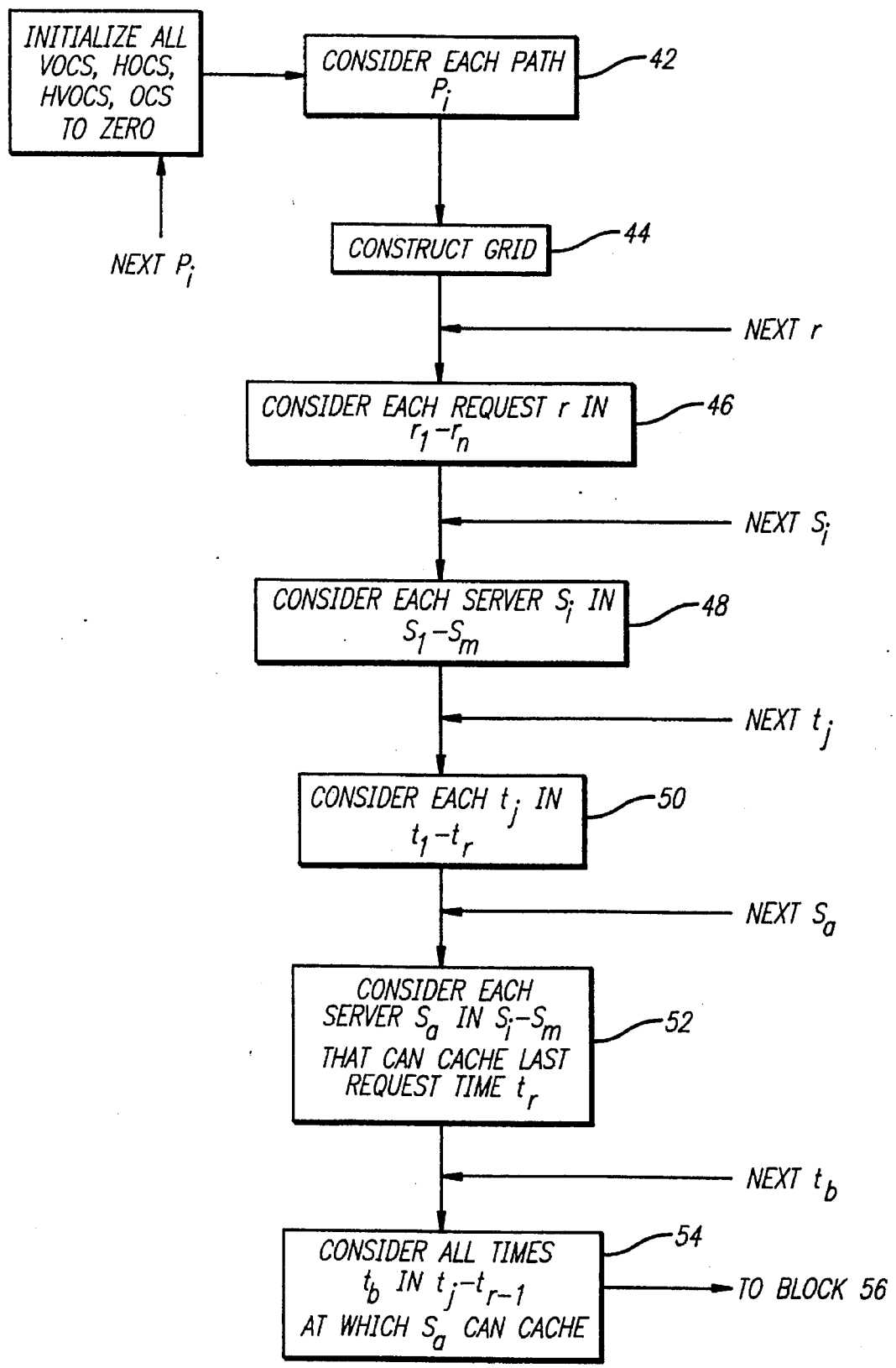
FIG. 4A and B is a flow chart showing the operational steps of the network shown in FIG. 2.
Figure 4B:
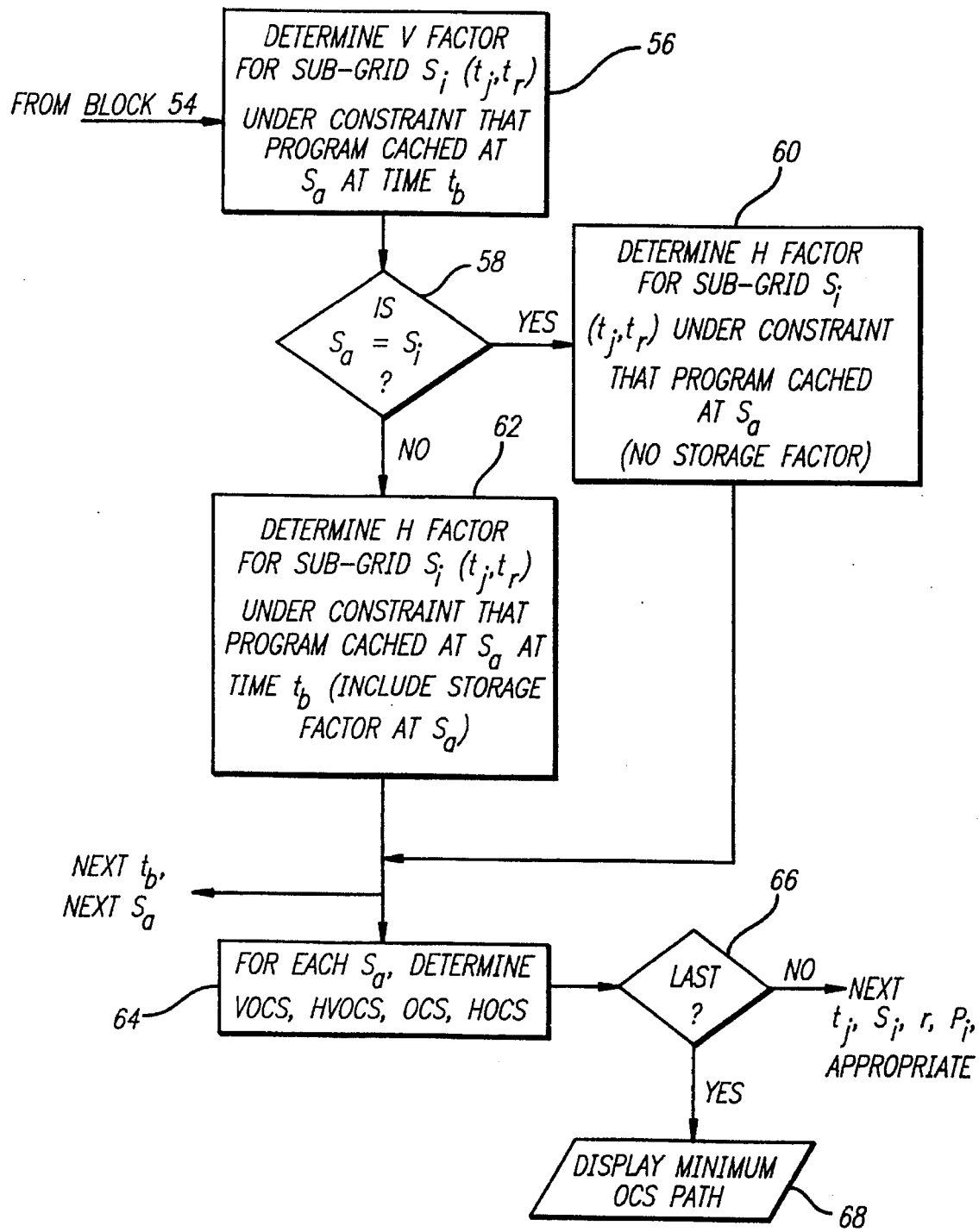

FIG. 4 is a flow chart showing the operational steps of the network 30 shown in FIGS. 2 and 3. It can be shown for the simplified tandem network 30 shown which uses only a single path of servers S, the below-described method optimally minimizes the aggregate delivery factor of the network 30. It is to be understood that the analysis disclosed below can be performed by a scheduler 36 (e.g., a type 486 personal computer) which is located at the server $S_1$ or any of the other servers S. Or, the analysis described below can be performed by a scheduler that is a personal service agent (PSA) 38 associated with a respective user U. The PSA 38 is described more fully below.

Starting at block 40 in FIG. 4, the scheduler 36 initializes certain parameters to zero. These parameters include all optimal caching schedule factors designated herein as HOCS, VOCS, HVOCS, and OCS.

It is to be understood that $[S_i][t_j, t_r]$ represents a grid having its leftmost vertex at $(t_j, S_i)$ and its rightmost vertex at $(t_r, S_m)$. As intended by the present invention, $S_i$ is the optimal server at which to cache a program for delivery to the last user $U_r$ (i.e., the user requesting program delivery at a time subsequent to program delivery to all other users) at time $t_r$, $S_m$ is the last server in the tandem series of servers, and $t_j$ is the optimal time at which the optimal server $S_i$ caches the program.

In accordance with the present invention, $OCS[S_i][t_j, t_r]$ represents the optimum caching schedule factor for the grid $[S_i][t_j, t_r]$. $HOCS[S_i][t_j, t_r]$ represents the optimum caching schedule factor for the grid $[S_i][t_j, t_r]$ under the constraint that the program is being cached at server $S_i$ during the entire time period $t_j$ to $t_r$. Such a constraint is necessary to ensure optimization. Also, none of the servers upstream of $S_i$ can be used in this schedule, in order to avoid contradicting the definition of time $t_j$ as being the optimal caching time for $S_i$.

Moreover, $VOCS[S_i, S_k][t_j, t_r]$ represents the optimum caching schedule factor for the grid $[S_i][t_j, t_r]$ under the constraint that one of the servers $S_k$, $k \in [1,i]$ is used for servicing the last user $U_r$. Furthermore, $HVOCS[S_i, S_k][t_j, t_r]$ represents the optimum caching schedule factor for the grid $[S_i][t_j, t_r]$ under the constraints that one of the servers $S_k$ is used for servicing the last user $U_r$, and that the program is cached at server $S_i$ during the period $t_j$ to $t_r$.

Blocks 42–54 represent a nested series of iterations that are next performed by the scheduler 36. Specifically, block 42 indicates that each path $P_i$ in a multi-tandem hierarchical network is considered (FIGS. 2 and 3 represent a tandem network 30 which has only a single path, whereas FIG. 1 represents a network 10 which has two paths $P_1$, $P_2$). Then, as indicated at block 44, for each path the scheduler 36 receives the delivery times $t_1$–$t_r$ from the respective users $U_1$–$U_n$, and constructs the grid 32.

Block 46 indicates that the below-described steps are completed for each user request "r", from $r_1$ to $r_n$ at respective delivery times $t_1$ to $t_r$. Next, block 48 indicates that for each user request r, the below-described steps are completed for each server $S_i$. For each server $S_i$, block 50 indicates that the below-described steps are completed for each time $t_j$, from $t_1$ to $t_r$. Thus, for any rectangular grid $[S_i][t_j, t_r]$ there are $(t_j-t_r)*(S_m-S_i)$ sub-grids for which horizontal and vertical constraints must determined.

Also, block 52 indicates that for each time $t_j$, the below-described steps are completed for each server $S_a$ in $S_i$ $S_m$. In other words, there are only $(S_m-S_i)$ possible ways in which the program can reach the client r.

Further, block 54 indicates that for each server $S_a$, the below-described steps are completed for each time $t_b$, in $t_j$ to $t_{r-1}$. As intended by the present invention, $t_b$ is the time at which the server $S_a$ caches the program.

Next, the factor ($V_{fac}$) associated with the vertical constraints of the sub-grid $[S_i][t_j, t_r]$ is determined by the scheduler 36 at block 56 as follows:

$$V_{fac}=VOCS[S_i, S_a][t_j, t_b]+HOCS[S_a][t_b, t_{r-1}]+SC_{acoef}*(t_r-t_b)+\Sigma_{s=a}^{m-1}NC_{s,s+1}.$$

After determining $V_{fac}$, the scheduler 36 moves to block 58, wherein the scheduler 36 determines whether the server $S_a$ under consideration is the $S_i$ under consideration. If it is, the factor ($H_{fac}$) associated with the horizontal constraints of the sub-grid $[S_i][t_j, t_r]$ is determined at block 60 as follows:

$$H_{fac}=HVOCS[S_i, S_a][t_j, t_b]+HOCS[S_a][t_b, t_{r-1}]+SC_{acoef}*(t_r-t_b)+\Sigma_{s=a^{m-1}}NC_{s,s+1}.$$

Otherwise, because caching at $S_i$ does not entail a storage factor, $H_{fac}$ is determined at block 62 as follows:

$$H_{fac}=HVOCS[S_i, S_a][t_j, t_b]+HOCS[S_a][S_a][t_b, t_{r-1}]+\Sigma_{s=a}^{m-1}NC_{s,s+1}.$$

After determining $V_{fac}$ and $H_{fac}$, the scheduler 36 iteratively repeats the above-described steps for each $t_b$ associated with each particular $S_a$, and then for the remainder of the possible servers $S_a$ with associated caching times $t_b$. More particularly, the scheduler 36 moves back to block 54 to retrieve the next $t_b$, and then repeats blocks 56–62 as appropriate. Upon using the last $t_b$, the scheduler 36 moves to block 52 to retrieve the next server $S_a$, and repeats blocks 54–62 for all times $t_b$ for that server $S_a$.

Each $V_{fac}$ and $H_{fac}$ so determined is stored, and then at block 64, the optimal schedules VOCS, HVOCS, OCS, and HOCS are determined as follows:

$VOCS[S_i, S_a][t_j, t_r]$=minimum $V_{fac}$ determined above among the various $V_{facs}$ for all servers $S_c$ in the range $S_i$ to $S_a$, with associated caching times $t_b$ for each server $S_c$ in the range of user request times from $t_j$ to $t_{r-1}$.

Also, $HVOCS[S_i, S_a][t_j, t_r]$=minimum $H_{fac}$ determined above among the various $H_{facs}$ for all servers $S_c$ in the range $S_i$ to $S_a$, with associated caching times $t_b$ for each server $S_c$ in the range of user request times from $t_j$ to $t_{r-1}$.

Further, $OCS[S_i][t_j, t_r]$=minimum $VOCS[S_i, S_a][t_j, t_r]$ for all servers $S_a$ in the range $S_i$ $S_m$; and $HOCS[S_i][t_j, t_r]$=minimum $HVOCS[S_i, S_a][t_j, t_r]$ for all servers $S_a$ in the range $S_i$ $S_m$.

After block 64, the scheduler 36 moves to block 66, wherein it is determined whether the last $t_j$ has been processed. If not, the scheduler 36 loops back to block 50 to retrieve the next $t_j$, and then repeats blocks 52–66. If the last $t_j$ has been processed, the scheduler 36 loops back to block 48 to retrieve the next $S_i$, and then repeats blocks 50–66. If the last $S_i$ has been processed, the scheduler 36 loops back to block 46 to retrieve the next user request, and then repeats blocks 48–66.

For the single-path tandem network 30 shown in FIGS. 2 and 3, the overall optimum path $OCS[S_1][t_1, t_n]$ resulting from the above steps defines the program transmission and caching paths to each user $U_n$. The output of the above steps is accordingly a series of transmission paths and storage server designations.

For the multi-path hierarchical network 10 shown in FIG. 1, after processing all user requests for path $P_1$, and obtaining and storing a corresponding $OCS[S_1][t_1, t_n]$, the scheduler loops back to block 40, reinitializes all VOCS, HOCS, HVOCS, and OCS to zero, and then steps through blocks 42–66 as described for the next path $P_2$. The minimum $OCS[S_1][t_1, t_n]$ so obtained is then displayed or otherwise output at block 68.

Figure 5:
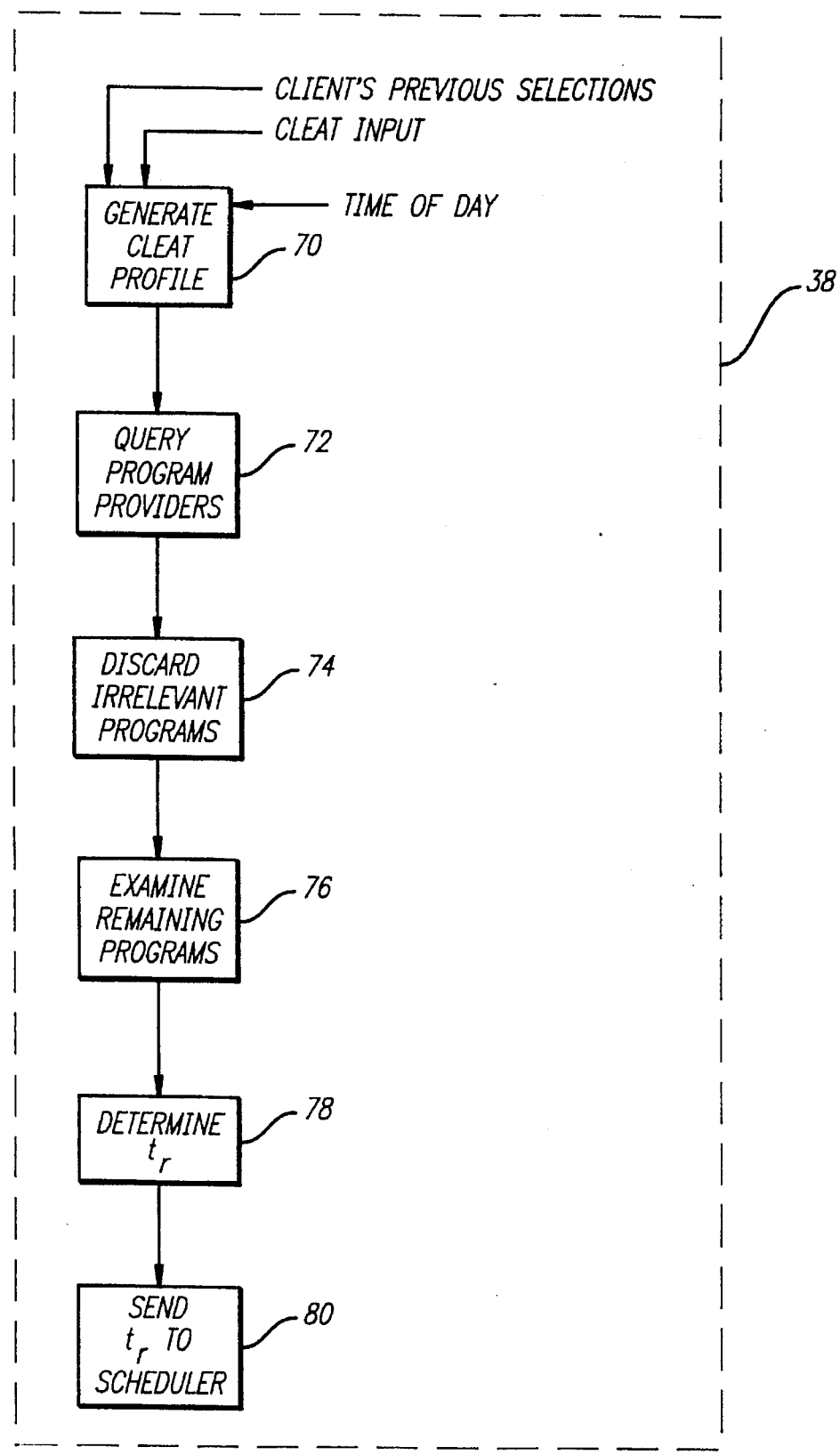
FIG. 5 is a flow chart showing the operational steps of a personal service agent.

Additionally, in cross-reference to FIGS. 2 and 5, each user $U_1$–$U_n$ can include a respective PSA 38 (only one PSA shown in FIGS. 2 and 5). Each PSA 38 is preferably a personal computer which analyzes the content of programs previously selected by the user's client (i.e., by the particular person being served) to select future programs for viewing by the client. Also, the PSA 38 schedules the selected programs for delivery to the client at the client's preferred viewing times.

Thus, when a PSA 38 is provided, the preselected delivery time $t_k$ discussed above is established by either the client of the user U or automatically, by the associated PSA 38. Moreover, in lieu of or in addition to the scheduler 36, the PSA 38 can optimize the transmission and storage factors borne by its associated user by adhering to the operational steps outlined above and shown in FIG. 4.

As shown at block 70 in FIG. 5, the PSA 38 initially analyzes the content of the programs selected by the client of the associated user U to generate inferences regarding the client's preferences. These inferences can depend on the time of day, i.e., the PSA 38 may note that the client prefers news formats in the early morning and educational programming in the evening.

Also, the PSA 38 can generate inferences of client preferences based direct client input regarding preferences. Based upon the inferences generated at block 70, the PSA 38 moves to block 72 to query program providers to determine the availability of programs relevant to the client's preferences. At block 74, the PSA 38 discards programs which are completely uninteresting to the client.

Then, at block 76, the PSA 38 examines the content of the remaining programs to determine which programs are to be delivered to the client by e.g., the network 10 or the network 30. At block 78, the PSA 38 determines when delivery is to occur (i.e., the PSA 38 determines $t_r$). Next, at block 80, the PSA 38 sends $t_r$ to the scheduler 36 for operation as disclosed in FIG. 4. Alternatively, the PSA 38 itself, in conjunction with other PSAs, can establish the delivery schedule in accordance with the method shown above.

While the particular system for efficient delivery of multimedia information as herein shown and described in detail is fully capable of achieving the above-stated objects of the invention, it is to be understood that it is illustrative of but one preferred embodiment, that other embodiments may exist that will be obvious to those skilled in the art, and that the scope of the present invention accordingly is to be limited by nothing other than the appended claims.

What is claimed is:

1. A multimedia delivery system for variously delivering a multimedia program to each of a plurality of users each at a respective preselected time, comprising:

at least one wide area server for transmitting the multimedia program at and upon a one time;

a hierarchical plurality of network servers for receiving the multimedia program from the wide area server at one or more primary servers located upstream in the hierarchy and for variously selectively caching the multimedia program for respective storage time periods and for then transmitting the multimedia program at the expirations of the respective time periods to further, secondary, servers downstream in the hierarchy until, at the secondary servers furthest downstream, ultimate program transmissions are to respective users each at its respective preselected time;

a scheduler, receiving the preselected times from the plurality of users, for, in consideration of these preselected times and of the hierarchical tree of network servers, determining the storage time periods at each of the plurality of network servers so as to minimize cumulative storage and transmission costs;

wherein the scheduler is determining when, where and for how long the program must be cached, and must be transmitted, between the wide area server and each of the plurality of network servers to each of the plurality of users in order to minimize said cumulative storage and transmission costs, as these costs are amortized over users ultimately receiving the program.

2. A multimedia delivery system for variously delivering a multimedia program to each of a plurality of users each at a respective preselected time, comprising:

at least one wide area server for transmitting the multimedia program at and upon a one time;

a hierarchical plurality of network servers for receiving the multimedia program from the wide area server at one or more primary servers located upstream in the hierarchy and for variously selectively caching the multimedia program for respective storage time periods and for then transmitting the multimedia program at the expirations of the respective time periods to further, secondary, servers downstream in the hierarchy until, at the secondary servers furthest downstream, ultimate program transmissions are to respective users each at its respective preselected time;

wherein each transmission of the program from the wide area server and further from each of the plurality of network servers has an associated predetermined transmission factor, wherein each storage period has an associated caching factor which caching factor increases in proportion to a duration of time during which an associated program is cached at an associated server, and wherein the cumulative transmission factors and caching factors associated with the delivery of the multimedia program from the at least one wide area server to the each of the plurality of users constitute, overall, an aggregate delivery factor; and a scheduler receiving the preselected times from the plurality of users, for, in consideration of these preselected times and of the hierarchical tree of network servers, determining the storage time periods at each of the plurality of network servers so as to minimize the aggregate delivery factor;

wherein the scheduler is determining when, where and for how long the program must be cached, and must be transmitted, between the wide area server and each of the plurality of network servers to each of the plurality of users in order to minimize cumulative storage and transmission costs, as these costs are amortized over users ultimately receiving the program.

3. The system of claim 2, wherein at least some of the network servers are arranged in tandem.

4. The system of claim 3, wherein the scheduler further comprises means for determining which network server caches the program for each user.

5. The system of claim 4, wherein the scheduler further comprises means for causing a network server to cache the multimedia program only at one of the preselected times.

6. The system of claim 5, wherein the scheduler comprises means for causing a plurality of networks servers to cache the program simultaneously.

7. In a multimedia delivery network for delivering a multimedia program to a plurality of users, a network architecture characterized by:

at least one wide area multimedia program transmitter;

at least two network switches in tandem between the wide area multimedia program transmitter and a user for selectively relaying the multimedia program to the user; and a network storage device associated with each network switch for selectively caching the multimedia program for a selective cache storage time period and for then causing the associated network switch to retransmit the multimedia program, towards a user at selective time, the multimedia program ultimately arriving at the user at a user-preselected time; and a scheduler for receiving the preselected times from the users and for establishing the time periods in response thereto.

8. The network of claim 7, further comprising a plurality of network switches with associated network storage devices arranged in tandem.

9. The network of claim 8; wherein the transmission of the multimedia program from the multimedia program transmitter has an associated predetermined transmission factor, transmission of the multimedia program from a network switch has an associated predetermined transmission factor, and each storage time period has an associated predetermined caching factor increasing over time, such that the transmission factors and caching factors associated with delivering the program from the wide area multimedia transmitter to each of the users at the preselected times establishes an aggregate delivery factor, and the scheduler establishes the storage time periods to minimize the aggregate delivery factor.

10. The network of claim 9, wherein the scheduler further comprises means for determining which network storage device caches the program for each user.

11. The network of claim 10, wherein the scheduler further comprises means for causing a network storage device to cache the multimedia program only at one of the preselected times.

12. The network of claim 11, wherein the scheduler comprises means for causing a plurality of network storage devices to cache the program simultaneously.

13. A method for delivering a multimedia program to a selected plurality of users each at an associated user-selected time, comprising the steps of;

(a) transmitting the program from a wide area transmitter;

(b) receiving the program at times at each of a hierarchical plurality of network servers as are situated between the wide area transmitter and the selected users; and (c) causing each network server of the hierarchical plurality of network servers to selectively cache the program for a selected time period and then retransmit the program at one or more respective selected times as does ultimately cause both that the multimedia program is ultimately delivered to the selected plurality of users each at an associated user-selected times and that it is so delivered so as to minimize both cumulative caching and transmission costs.

14. The method of claim 13, wherein at least one of the network servers receives the program from the wide area transmitter and retransmits the program at one of the preselected times to another network server.

15. The method of claim 14, wherein the transmission of the multimedia program from the wide area transmitter has an associated predetermined transmission factor, transmission of the multimedia program from a network server has an associated predetermined transmission factor, and each storage time period has an associated predetermined caching factor increasing over time, such that the transmission factors and caching factors associated with delivering the program from the wide area transmitter to each of the users at the preselected times establishes an aggregate delivery factor, and the method further comprises the step of:

(e) establishing the storage time periods to minimize the aggregate delivery factor.

16. The method of claim 15, further comprising the steps of:

(f) determining which network server caches the program for each user; and (g) causing a network server to cache the multimedia program only at one of the preselected times.

17. A method of organizing and operating a multimedia delivery system for optimizing various deliveries of a multimedia program to each of a multiplicity of users each at a respective preselected time, the method comprising:

transmitting the multimedia program at and upon at least one time from at least one wide area server;

receiving the multimedia program from the wide area server into a root node of a hierarchical tree of network servers, and variously selectively caching the multimedia program for a respective storage time period at this root node network server and then selectively transmitting the multimedia program at the expiration of the respective time period further along the hierarchical tree, the selective caching and the selective transmitting continuing at each of the network servers until, at leaf node network servers, further, ultimate, program transmissions are to the each of the multiplicity respective users, each transmission being at the preselected time respective of the user;

wherein each transmission of the program from the wide area server and further from each of the plurality of network servers has an associated predetermined transmission factor;

wherein each storage period has an associated caching factor which caching factor increases in proportion to a duration of time during which an associated program is cached at an associated network server;

wherein the cumulative transmission factors and caching factors that are associated with the delivery of the multimedia program from the at least one wide area server to the each of the plurality of users constitute, overall, an aggregate delivery factor; and scheduling, in consideration of the preselected times and the hierarchical tree of network servers, the storage time periods at each of the plurality of network servers so as to minimize the aggregate delivery factor;

wherein the scheduler is determining when, where and for how long the program must be selectively cached, and when it must be selectively transmitted, between the wide area server and each of the plurality of network servers to each of the plurality of users in order to minimize cumulative storage and transmission costs, as these costs are amortized over users ultimately receiving the program.

18. The multimedia delivery system organizing and operating method according to claim 17 wherein the optimizing is under the constraint that the program is being cached at one only of the network servers in the hierarchical tree of network servers for an-entire time period persisting from the origination of the program at the at least one wide area server until delivery of the program to a one of the users last receiving the program in chronological time;

wherein none of the network servers upstream, meaning toward the root node network sever, of that network server that caches the program for the entire time period does also cache the program;

wherein caching redundancy is avoided, and optimization achieved.

19. The multimedia delivery system organizing and operating method according to claim 18 wherein the optimizing is under the further constraint that a one of the network servers that is downstream, meaning toward the leaf node network servers, form that network server that does cache the program for the entire time period does finally deliver the program to that one of the users last receiving the program in chronological time;

wherein the program moves only in a one direction, from the root node towards the leaf nodes, in the hierarchical tree of network servers;

wherein transmitting redundancy is avoided, and optimization achieved.

* * * * *